E. F. PRESBREY,

Assignor to E. N. FOOTE.

Ornamentation of Bracelets and other Articles.

No. 8,577. Reissued Feb. 11, 1879.

Witnesses
Wm H. Chapin
H. A. Chapin

Inventor
Edward F. Presbrey
By Chapin & Co
Attys

UNITED STATES PATENT OFFICE.

EDWARD F. PRESBREY, OF PROVIDENCE, RHODE ISLAND, ASSIGNOR TO EDWARD N. FOOTE, OF NORTHAMPTON, MASSACHUSETTS.

IMPROVEMENT IN THE ORNAMENTATION OF BRACELETS AND OTHER ARTICLES.

Specification forming part of Letters Patent No. 156,858, dated November 17, 1874; Reissue No. 8,577, dated February 11, 1879; application filed November 22, 1878.

*To all whom it may concern:*

Be it known that I, EDWARD F. PRESBREY, of the city and county of Providence, in the State of Rhode Island, have invented certain new and useful Improvements in Ornamenting Bracelets, Jewelry, and other useful and fancy articles made of metals, which improvements are fully set forth in the annexed specification and in the accompanying drawings.

Figure 1:
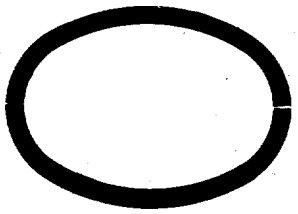
Figure 2:
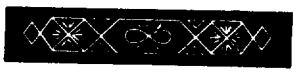
Figure 3:
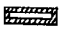

Referring to the drawings, Figure 1 is a side view of a bracelet. Fig. 2 is a top view of the same, and Fig. 3 is a view of the end of one section.

The object of my invention is to provide a means for ornamenting at a moderate expense useful and ornamental articles made of metal, among which are bracelets and like articles of jewelry.

In carrying out my invention I make the above-mentioned metallic articles from brass or other cheap metal, and subsequently I enamel or japan them, so as to conceal the metal, as shown in the drawings. I then produce ornamental figures on such articles prepared as above described, of which Fig. 2 illustrates one form, by engraving or cutting said ornamental figures through the enamel or japan which covers the surface, cutting slightly into the metal beneath, thus making the lines of the figures so formed very distinct and brilliant, by reason of their contrast with the enameled or japanned surface which surrounds them, thus forming an attractive but cheaply-produced ornamentation.

What I claim as my invention is—

The hereinbefore-described method of ornamenting useful and ornamental articles made of metal, which consists in coating said articles with enamel or japan, and in subsequently cutting or otherwise engraving ornamental figures through the said coating, so as to expose the metal thereunder to view, substantially as set forth.

EDWARD F. PRESBREY.

In presence of—
H. A. CHAPIN,
WM. H. CHAPIN.